United States Patent Office 2,944,891
Patented July 12, 1960

2,944,891

BRAZING ALLOYS

Arthur T. Cape, Los Angeles, Calif., assignor to Coast Metals, Inc., Little Ferry, N.J., a corporation of Delaware No Drawing. Filed May 11, 1959, Ser. No. 812,122

3 Claims. (Cl. 75—170)

This invention relates generally to brazing alloys, but has reference more particularly to alloys of the type disclosed in Cape Patent Nos. 2,743,177 and 2,755,183.

In the aforesaid patents, a series of nickel-silicon-boron brazing alloys is disclosed, consisting essentially of silicon in amounts of from about 2.5 to 5.5%, boron in amounts of from about 0.75 to about 5.25%, and the balance essentially nickel. In some instances, as in Patent No. 2,755,183, the alloys contain chromium and iron in critical amounts.

One of the outstanding characteristics of these alloys is that while the most suitable compositions are hard and relatively brittle, there is a tendency for the alloys, when used for brazing purposes, to dissolve the surfaces of the parts which are being joined, which reduces the hardness of the material in the joint. By this means a ductile joint is obtained.

There are, however, many cases, in which the dissolving of the base metal cannot be tolerated, as for example, where the parts being joined are extremely thin, as in the case of honeycomb stainless steel structures. It is possible, by brazing at temperatures close to the melting point of the brazing alloy, to prevent undue dissolving of the 0.0015" foil of the honeycomb structure, so that a hard alloy is left in the joint and in the fillet, but there is then susceptibility to cracking during flexure of the structure. In other instances, a part or structure has to be bent or formed after brazing, and the hard alloy is the site of cracking and failure.

In my copending application, Serial No. 742,779, filed June 18, 1958, I have disclosed the addition of cobalt, in predetermined amounts, to brazing alloys of the aforesaid type, to prevent the attack or dissolving of the base metal. These alloys are hard, and while for many purposes they are entirely satisfactory, there is nevertheless, an urgent need for an alloy of this type which is ductile and tough in its own right, and yet satisfactorily wets the surfaces to be joined, without producing weak structures.

To achieve this result, the boron content of the basic nickel-silicon-boron composition is lowered, but if this is done without adding some other element or elements, then the melting point of the alloy is raised to impracticable values.

I have discovered that an element which reduces the melting point of such basic low-boron compositions, while imparting ductility to the alloy, is gold.

The amount of gold which may be added to the alloy may range from about 2.5% to about 20%, with about 10% as an optimum amount.

Colbalt may be added to the alloy in amounts up to 20% for the purpose of increasing the strength and ductility of the alloy. The cobalt apparently does not change the melting point of the alloy, nor does it appear to affect the hardness of the alloys.

As the silicon is increased, the melting point of the alloy decreases somewhat, but not to as great an extent as when gold is not present in an alloy of this type. The presence of gold changes the nature of the alloy system, and silicon is no longer useful as a means of producing flow at lower temperatures.

The alloy also contains manganese, in amounts of from about 10% to about 30%, and may contain chromium, in amounts up to about 10%, and iron, in amounts up to about 10%.

In general, the alloy will contain the following elements, within the ranges stated:

| | Percent |
|---|---|
| Gold | 2.5–20 |
| Boron | 0.5– 3 |
| Silicon | 0.5–3.5 |
| Manganese | 10– 30 |
| Cobalt | 0–20 |
| Chromium | 0–10 |
| Iron | 0–10 |
| Nickel | Remainder |

A preferred alloy, within the ranges stated, is one containing 10% gold, 1.75% boron, 2.9% silicon, 17% manganese, 10% cobalt, 2% chromium, and the remainder, nickel.

The preferred alloy has a flow point of the order of 1850° F., and is particularly adaptable for brazing at 1900° F., being especially well adapted for joining copper to stainless steel.

If the gold content of the alloy is substantially in excess of 20%, the alloy will tend to flow away from the joints.

It will be understood that slight changes may be made in the alloy compositions, without departing from the spirit of the invention or the scope of the appended claims.

Having thus described my invention, I claim:

1. A brazing alloy containing from about 2.5% to about 20% gold, from about 0.5% to about 3% boron, from about 0.5% to about 3.5% silicon, from about 10% to about 30 managnese, and the remainder substantially nickel.

2. A brazing alloy, as defined in claim 1, containing up to 20% cobalt, up to 10% chromium, and up to 10% iron.

3. A brazing alloy consisting of about 10% gold, about 1.75% boron, about 2.9% silicon, about 17% manganese, about 10% cobalt, about 2% chromium, and the remainder nickel.

No references cited.